Feb. 14, 1928.

P. WERNER

FOLDING KNIFE

Original Filed Oct. 28, 1926

1,659,418

INVENTOR.
Pablo Werner
BY
ATTORNEY

Patented Feb. 14, 1928.

1,659,418

UNITED STATES PATENT OFFICE.

PABLO WERNER, OF ESCUINTLA, MEXICO.

FOLDING KNIFE.

Application filed October 28, 1926, Serial No. 144,721. Renewed November 17, 1927.

This invention relates to a new and useful device in the nature of a knife. The invention has particular reference to a folding knife.

The object of the invention is to provide a knife having a folding handle to protect the blade, so as to permit of carrying the knife, when closed, in the pocket.

A further object is to provide a folding knife having a means of adjusting the handle, when open, to fit the hand or grip of the user.

Another object is to provide a folding knife of novel construction and arrangement of parts; hereinafter more fully described, claimed, and illustrated in the accompanying drawing in which:

Figure 1:
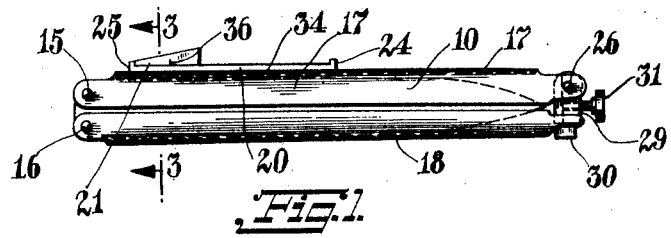
Fig. 1 shows a side elevational view of my improved device, as it would appear when folded, or closed, so as to be carried in the pocket.

As here embodied my improved folding knife comprises blade 10, having preferably two longitudinal cutting edges 11 and 12, oppositely located, and terminating in a point 13. The butt end 14, of the blade 10, has pivotally attached thereto, as at 15 and 16, the two handle members 17 and 18, which are of V section, and of suitable length to enclose the blade 10, as clearly shown in Fig. 1 of the accompanying drawing.

The handle element 17 has two parallel longitudinal projecting channel portions 19 and 20, located at its outer edge to slidably accommodate a wedge shaped block 21 having protruding portions 22 and 23 to engage the projecting channel portions 19, the extremities of which are bent or otherwise formed as at 24 and 25, after the wedge shaped block 21 is placed or slid into position, to prevent the said wedge shaped block from becoming lost.

Figure 2:
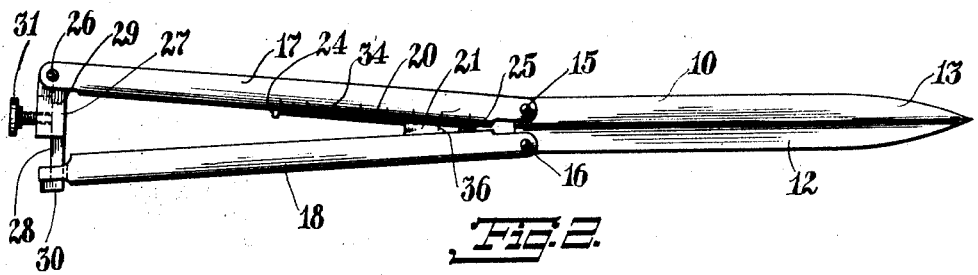
Fig. 2 shows a side elevational view of my improved device, as it would appear when open, ready for use.
Figure 3:
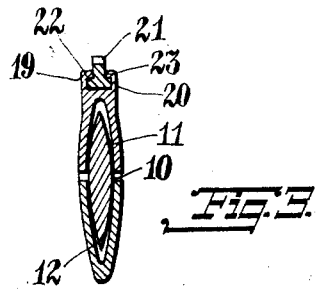
Fig. 3 shows an enlarged vertical sectional view taken on the line 3—3 of Fig. 1.
Figure 4:
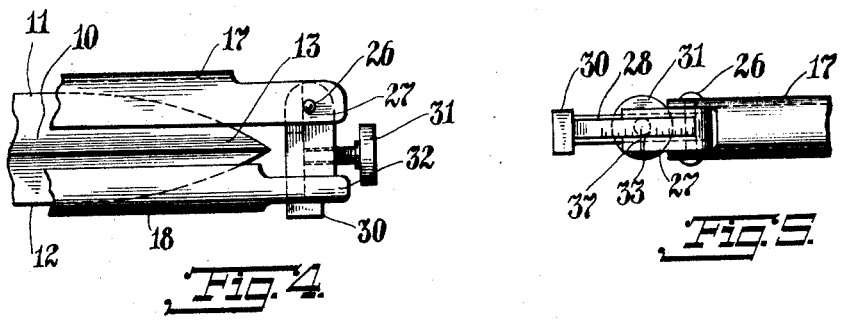
Fig. 4 shows an enlarged fragmentary view of the one end of my improved device, showing in particular the means for holding the handle closed, when the knife is to be carried in the pocket.
Figure 5:
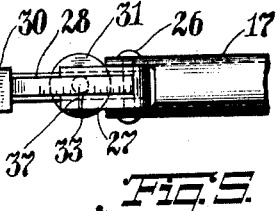
Fig. 5 shows an enlarged end view of the mechanism as illustrated in Fig. 4.

The handle element 17 has pivotally attached thereto at its outer extremity, as at 26 a locking device comprising a support 27 having an elongated V slot to slidably accommodate the locking member 28, as at 29, which is provided with an enlarged extremity 30. The said support 27 is provided with threaded aperture to accommodate the locking screw 31, or any similar suitable means of holding the said locking member 28 in any desired position in the said elongated V slot of the support 27. The second handle element 18 has a slot 32 formed at its other extremity to accommodate the enlarged extremity 30 of the locking member 28, when the handle elements 17 and 18 are closed, or folded over the blade 10, as clearly shown in Fig. 4 of the accompanying drawing; and to hold the handle elements 17 and 18 in an extended position, as clearly shown in Fig. 2 of the accompanying drawing. It will be understood that graduations 33 and 34, are placed on the locking member 28 and on the handle element 17 adjacent to the index marks 35 and 36 located in the support 27 and in the wedge shaped block 21 respectively, the said graduations and the said index marks being so located as to determine the proper relation of the said locking member to the said wedge shaped blocks so as to enable the hereinbefore mentioned locking member to engage the said slot in the extremity of the said second handle element.

It will be obvious that by sliding the wedge shaped block 21, as hereinbefore set forth, that the relative angle of the handle elements 17 and 18 may be changed or varied, when the said handle elements are in an opened position, so as to fit the hand or grip of the user, and that the said locking member may be placed in the proper position to engage the slot formed in the extremity of the said second handle element.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. A knife comprising handle elements to enclose a blade, and a means for opening the said handle elements to accommodate the grip of the user, and a means for locking the said handle elements in the opened position.

2. A knife comprising handle elements to enclose a blade, a means for holding the said handle elements in a closed position, and an adjustable means for opening the said handle elements to accommodate the grip of the user.

3. A knife comprising handle elements to enclose a blade, a means for holding the said handle elements in a closed position, and an adjustable means for opening the said handle elements to accommodate the grip of the user, and a means for locking the said handle elements in the opened position.

4. In a device of the class described, a handle element and a second handle element pivotally attached to a blade so as to enclose the said blade, a locking member pivotally attached to the outer extremity of the said handle element, said locking member having protruding side portions, the said second handle element having a slot formed in its outer extremity to accommodate the said locking member, when the said handle element and the said second handle element are closed, so as to hold the said handle elements in a closed position.

5. In a device of the class described, a handle element and a second handle element pivotally attached to a blade, the said handle element having two parallel longitudinal projecting channel portions located at its outer edge to slidably accommodate a wedge shaped block having protruding portions to engage the said projecting channel portions of the said handle element, to vary the relative angle of the said handle element and the said second handle element, when in an opened position so as to fit the grip of the user.

6. A knife, comprising a blade, a handle element and a second handle element pivotally attached to the butt of the said blade, so as to enclose the said blade, and so as to form a handle when folded out, a locking member pivotally attached to the said handle element engaging in a slot in the said second handle element, when the said handle elements are closed, so as to hold the said handle elements in a closed position, said handle element having a wedge shaped block slidably attached thereto, so as to vary the relative angle of the said handle elements when opened, so as to fit the grip of the user.

7. In a device of the class described, a means of locking the handle element and a second handle in an open position comprising a support pivotally attached to the said handle element, a locking device, slidably attached to the said support, having an enlarged extremity to engage a slot formed in the extremity of the said second handle element.

8. In a device of the class described a wedge shaped block having graduations to correspond with similar graduations on a locking member, as a means of locking handle elements in any relative open position.

In testimony whereof I have affixed my signature.

PABLO WERNER.